(12) United States Patent
Sohn et al.

(10) Patent No.: US 8,269,740 B2
(45) Date of Patent: Sep. 18, 2012

(54) LIQUID CRYSTAL DISPLAY

(75) Inventors: Minho Sohn, Paju-si (KR); Jongseong Choi, Paju-si (KR); Hyunguk Jang, Goyang-si (KR); Sangrae Lee, Gunpo-si (KR); Jaejung Han, Seoul (KR); Sanghyuck Bae, Paju-si (KR); Byungchun Yu, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 580 days.

(21) Appl. No.: 12/585,110

(22) Filed: Sep. 3, 2009

(65) Prior Publication Data

US 2010/0156825 A1 Jun. 24, 2010

(30) Foreign Application Priority Data

Dec. 18, 2008 (KR) .................. 10-2008-0129572

(51) Int. Cl.
*G06F 3/041* (2006.01)
(52) U.S. Cl. .................................. 345/173; 345/175
(58) Field of Classification Search .................. 345/173, 345/174, 175, 176, 178; 178/18.09
See application file for complete search history.

(56) References Cited

U.S. PATENT DOCUMENTS

2009/0066662 A1* 3/2009 Liu et al. .................. 345/173
2009/0251425 A1* 10/2009 Sohn et al. ................ 345/173

* cited by examiner

*Primary Examiner* — Latanya Bibbins
(74) *Attorney, Agent, or Firm* — McKenna Long & Aldridge LLP

(57) ABSTRACT

A multi-touch sensing method and apparatus are described. The multi-touch sensing method includes: storing, in a memory, coordinate values of a first dead zone and coordinate values of a second dead zone existing between first and second pair of image sensors, respectively; calculating coordinate values of touch points from images obtained by the first and second pairs of image sensors; comparing the coordinate values of the touch point and the coordinate values of the dead zones to identify the location of the dead zone to which the touch point belongs; selecting the coordinate values calculated in the third step if the coordinate values of the touch point belong to the first dead zone; and selecting the coordinate values calculated in the second step if the coordinate values of the touch point belong to the second dead zone.

10 Claims, 10 Drawing Sheets

FIG. 7 touch object

LIQUID CRYSTAL DISPLAY

This application claims the benefit of Korean Patent Application No. 10-2008-0129572 filed on Dec. 18, 2008, which is incorporated herein by reference for all purposes as it fully set forth herein.

BACKGROUND OF THE INVENTION

1. Field of the Invention

This document relates to a liquid crystal display, and more particularly, to an apparatus and method of multi-touch sensing which can increase the touch recognition rate and accuracy of a dead zone and eliminate a virtual image.

2. Description of the Related Art

Generally, a touch panel is a type of user interface that is attached to a display device with the property that an electrical characteristic thereof is changed at a contact point where a hand or a pen touches the panel. Touch panels have been used in various applications, such as in small portable terminals, office equipment and the like. However, if a multi-touch is generated by two or more substantially simultaneous contact points, the touch panel might malfunction or any one of the touches can be selected by a pre-set program.

In order to overcome the limit of multi-touch recognition in the touch panel of the related art, there has recently been developed a multi-touch recognition device which simultaneously recognizes a plurality of touches.

In the recently developed multi-touch recognition device, there is a dead zone where the touch recognition rate is significantly reduced and the accuracy is reduced according to the location of sensors and a touch recognition algorithm. Also, the multi-touch recognition device may generate a virtual image due to the shadow effect of a real touch object upon multi-touch, and the coordinates of such a virtual image may be wrongly recognized as the coordinates of a real touch position.

SUMMARY

Accordingly, the present invention has been made to solve the above-mentioned problems occurring in the prior art, and an aspect of the present invention is to provide an apparatus and method of multi-touch sensing which can increase the touch recognition rate and accuracy of a dead zone and eliminate a virtual image.

To achieve the above aspect, there is provided a multi-touch sensing method according to an exemplary embodiment of the present invention, including: (A) storing, in a memory, coordinate values of a first dead zone existing between a first pair of image sensors and coordinate values of a second dead zone existing between a second pair of image sensors; (B) calculating coordinate values of a touch point from images obtained by the first pair of image sensors; (C) calculating the coordinate values of the touch point from images obtained by the second pair of image sensors; (D) comparing the coordinate values of the touch point and the coordinate values of the dead zones to identify a location of the dead zone to which the touch point belongs; (E) selecting the coordinate values calculated in the third step if the coordinate values of the touch point belong to the first dead zone; and (F) selecting the coordinate values calculated in the step B if the coordinate values of the touch point belong to the second dead zone A multi-touch sensing apparatus according to an exemplary embodiment of the present invention includes: first and second pairs of image sensors installed in vicinity of the corners of a touch surface; a memory for storing coordinate values of a first dead zone existing between the first pair of image sensors and coordinate values of a second dead zone existing between the second pair of image sensors; and a multi-touch processor which calculates coordinate values of a touch point from images obtained by the first pair of image sensors and coordinate values of the touch point from images obtained by the second pair of image sensors, compares the coordinate values of the touch point and the coordinate values of the dead zones to identify a location of the dead zone to which the touch point belongs as a result of comparison, selects the coordinate values calculated from the images obtained by the second pair of image sensors if the coordinate values of the touch point belong to the first dead zone, and selects the coordinate values calculated from the images obtained by the first pair of image sensors if the coordinate values of the touch point belong to the second dead zone.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4a to 4c are views showing various exemplary embodiments of image sensors;

FIGS. 11 to 13 are views showing an example of a virtual image;

DETAILED DESCRIPTION OF THE PREFERRED EMBODIMENTS

The above and other aspects and features of the present invention will become more apparent by describing exemplary embodiments thereof with reference to the attached drawings.

Hereinafter, implementations of this document will be described in detail with reference to FIGS. 1 to 16.

Referring to FIGS. 1 to 4, a multi-touch sensing apparatus according to an exemplary embodiment of the present invention includes a control board 30 which controls the touch and display module 20 and calculates the coordinates of a touch point, and a system 40 for supplying data RGB which are to be displayed along with a timing signal, to the control board 30.

Figure 1:
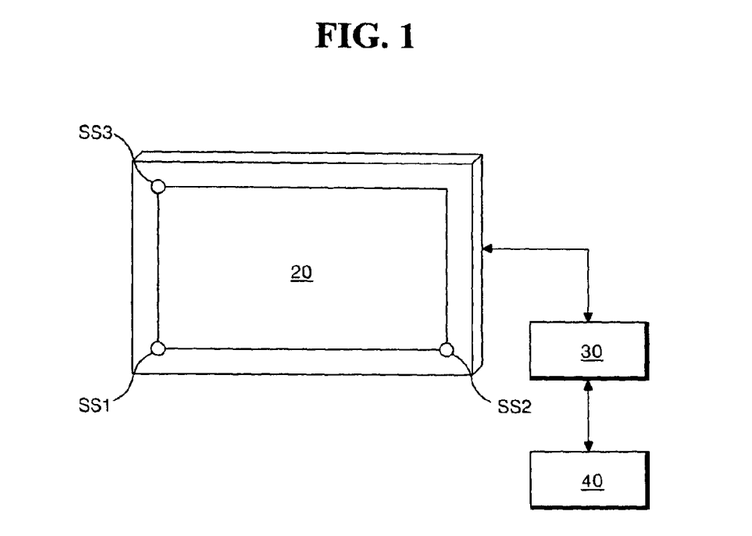
FIG. 1 is a block diagram showing a multi-touch sensing apparatus according to an exemplary embodiment of the present invention.
Figure 2:
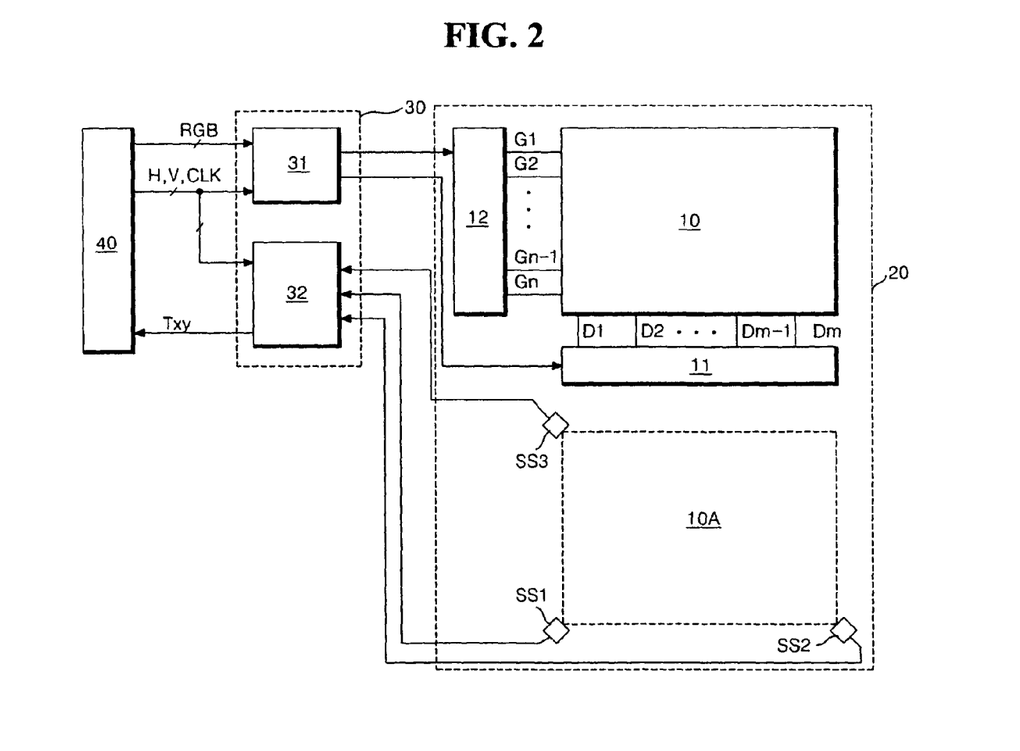
FIG. 2 is a block diagram showing in detail the multi-touch sensing apparatus shown in FIG. 1.

The touch and display module 20 includes a display panel 10 having a pixel display panel 10 having a pixel array 10A on which a picture is displayed, a source driver 11 for supplying data voltages to data lines D1 to Dm of the display panel 10, a gate driver 12 for supplying scan pulses to gate lines G1 to Gn of the display panel 10, and image sensors SS1 to SS3 disposed in the vicinity of the three corners of the touch surface 10A existing on the pixel array.

The display panel 10 may be implemented as flat panel displays, such as a liquid crystal display, a field emission display, a plasma display panel, and an electroluminescence device EL, such as an inorganic electroluminescence element and an organic light emitting diode OLED. Although a liquid crystal display panel has been illustrated as one example of the display panel 10, the display panel 10 is not limited thereto but may be implemented as any display panel of the flat panel display.

Figure 3:
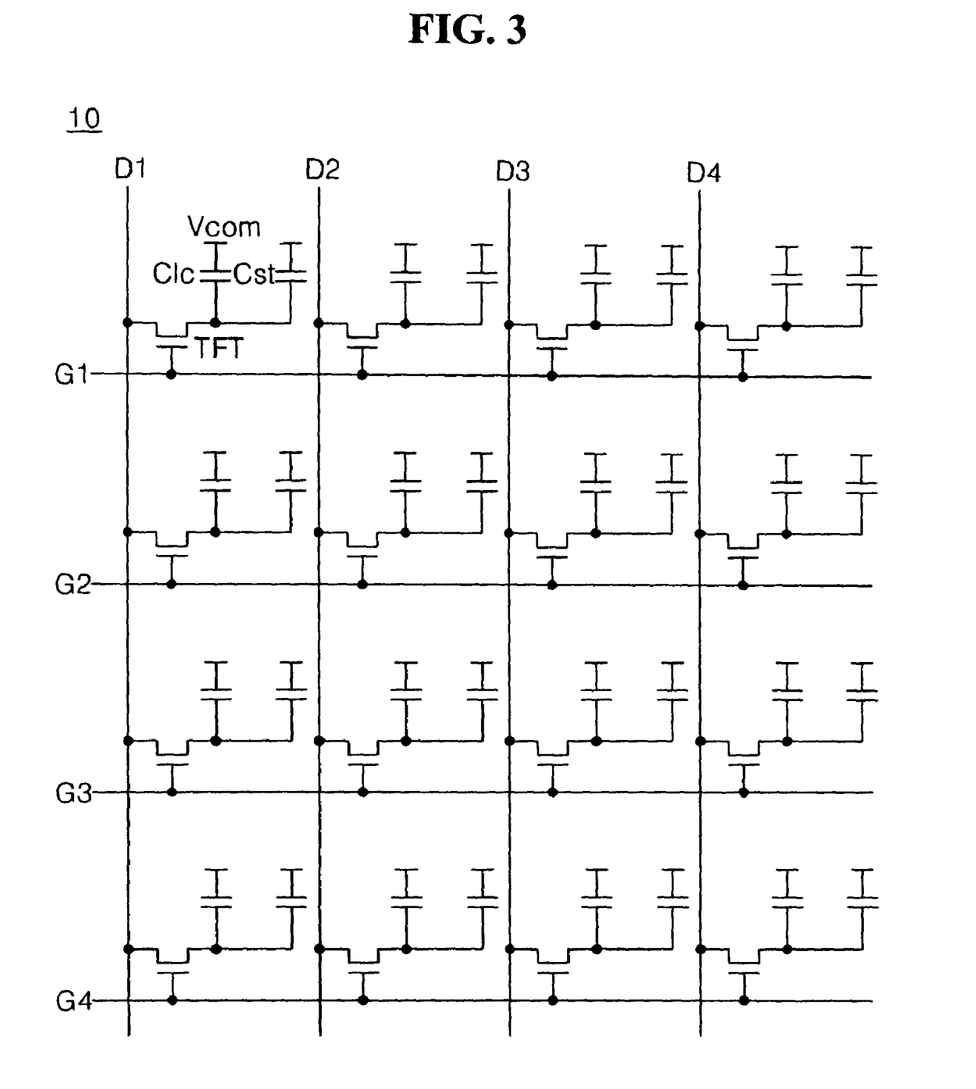
FIG. 3 is a circuit diagram equivalently showing a portion of a pixel array of a liquid crystal display panel shown in FIG. 2.

The display panel 10 includes a thin film transistor (hereinafter, referred to as "TFT") substrate and a color filter substrate. A liquid crystal layer is formed between the TFT substrate and the color filter substrate. In the TFT substrate, the data lines D1 to Dm and the gate lines G0 to Gn are formed to perpendicularly cross each other on a lower glass substrate, and liquid crystal cells Clc are disposed in a matrix pattern in the cell areas defined by the data lines D1 to Dm and the gate lines G1 to Gn. The TFTs formed in the crossing parts of the data lines D1 to Dm and the gate lines G1 to Gn transmit the data voltages, which is supplied through the data lines D1 to Dm, to the pixel electrodes of the liquid crystal cells in response to scan pulses from the gate lines G1 to Gn. To this end, a gate electrode of the TFT is connected to the gate line G1 to Gn, and a source electrode thereof is connected to the data line D1 to Dm. A drain electrode of the TFT is connected to the pixel electrode of the liquid crystal cell Clc. A common voltage Vcom is supplied to a common electrode facing the pixel electrode.

The color filter substrate includes a black matrix and color filters which are formed on an upper glass substrate. The common electrode is formed on an upper glass substrate in a vertical electric field drive method such as a twisted nematic (TN) mode and a vertical alignment (VA) mode, and is formed on a lower glass substrate along with the pixel electrode in a horizontal electric field drive method such as an in-plane switching (IPS) mode and a fringe-field switching (FFS) mode.

In FIG. 3, reference numeral 'Cst' represents a storage capacitor. The storage capacitor Cst can be formed by the overlapping of the gate line GL and the pixel electrode of the liquid crystal cell Clc. Further, the storage capacitor Cst can be formed by the overlapping of a separate common line and the pixel electrode.

The liquid crystal mode of the liquid crystal display panel 10 may be implemented as any liquid crystal mode, as well as the above-stated TN mode, VA mode, IPS mode, and FFS mode. Moreover, the display panel 10 may be implemented in any form including a transmissive liquid crystal display, a semi-transmissive liquid crystal display, and a reflective liquid crystal display. The transmissive liquid crystal display and the semi-transmissive liquid crystal display require a backlight unit which is omitted in the drawings.

The source driver 11 includes a plurality of data integrated circuits (hereinafter, referred to as "IC"). The source driver 11 converts digital video data RGB inputted from the control board 30 into positive or negative analog gamma compensation voltages under control of the control board 30, and supplies the analog gamma compensation voltages to the data lines D1 to Dm as analog data voltages.

The gate driver 12 includes a plurality of gate drive ICs. The gate driver 12 sequentially supplies scan pulses to the gate lines G1 to Gn under control of the control board 30.

The source drive ICs and the gate drive ICs may be connected to data/gate signal line pads formed on the lower glass substrate by a tape-automated-bonding (TAB) method using a tape carrier package (TCP) or a chip-on-glass (COG) method. The gate drive ICs of the gate driver 12 may be formed on the lower glass substrate by the same process as a manufacturing process of a TFT array of the display panel 10 at the same time when the TFT array is formed.

Figure 4A:
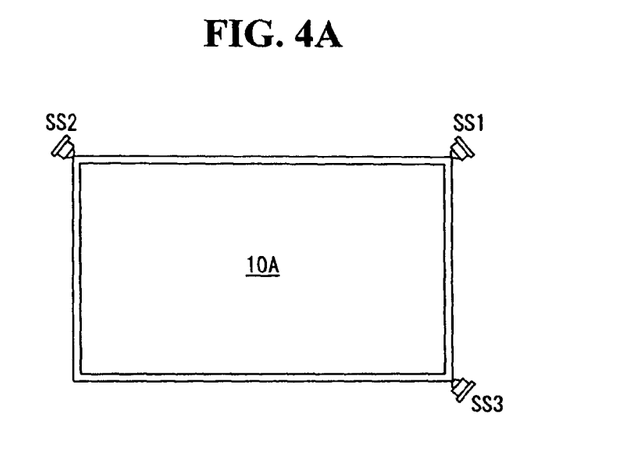
Figure 4B:
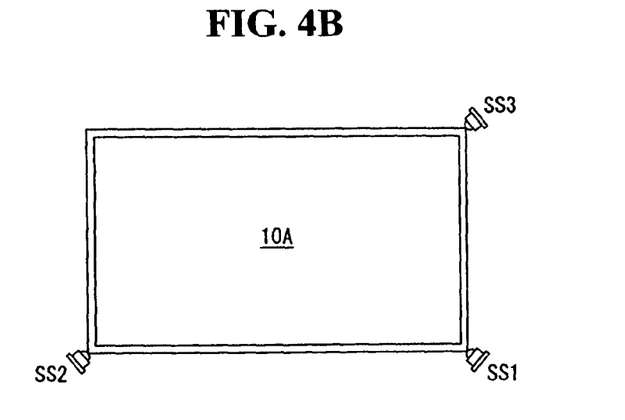
Figure 4C:
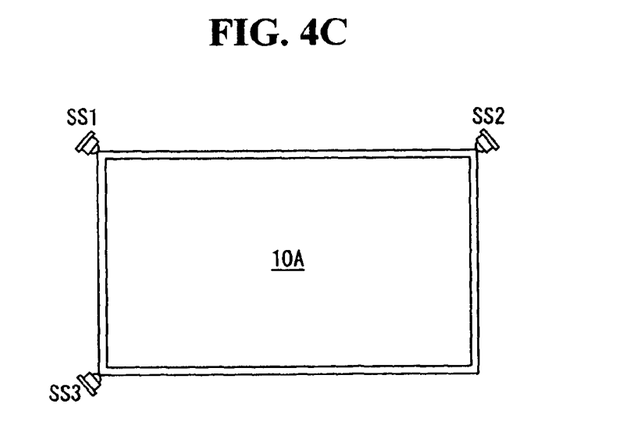

The image sensors SS1 to SS3 can be implemented as cameras using CMOS (complementary metal oxide semiconductor) sensors, and can be positioned at the three corners of the touch surface 10A existing on the display panel 10 of the display panel 10. Each of the image sensors SS1 to SS3 takes the image of the touch surface 10A and the vicinity thereof up to a predetermined height from the touch surface 10A. The CMOS sensor used as the image sensors SS1 to SS3 can have a resolution from about 320×240 pixels to about 1280×1024 pixels. The touch image taken from each of the image sensors SS1 to SS3 is supplied to the control board 30. The lens angle of view (or viewing angle) of each of the image sensors SS1 to SS3 is around 80°-90°. One or more infrared light sources may be disposed at the edge of the touch surface 10A in order to increase the sensitivity of the image sensors SS1 to SS3. The infrared light source irradiates infrared light onto the touch surface 10A. The coordinates of touch points are calculated at the crossing points of extended lines at an angle of two image sensors facing the touch points. Accordingly, though the image sensors may include at least two image sensors, they may include at least three image sensors because it is impossible to compensate for touch recognition in a dead zone and eliminate a virtual image if touch points are recognized by only a pair of image sensors as described later. The image sensors SS1 to SS3 form a first pair of image sensors SS1 and SS2 and a second pair of image sensor pair SS1 and SS3 in order to eliminate the touch coordinates of a dead zone and the coordinates of a virtual image and reduce the number of image sensors. The first and second pairs of image sensors SS1 and SS2 and SS1 and SS3 share the first image sensor SS1. The third image sensor SS3 serves to eliminate a coordinate value of a dead zone by pairing with the first image sensor SS1, and serves to acquire angle values of real touch points to be compared with touch points acquired from the first pair of image sensors SS1 and SS2 in order to eliminate a virtual image. The disposition of the image sensors SS1 to SS3 is not limited to FIGS. 1 and 2, but may be variously modified under the condition that they are disposed in the vicinity of the three of the four corners of the touch surface 10A as shown in FIGS. 4A to 4C.

The control board 30 is connected to the source driver 11 and the gate driver 12 through a flexible printed circuit (FRC) and a connector. The control board 30 includes a timing controller 31 and a multi-touch processor 32.

The timing controller 31 generates a gate control signal for controlling the operation timing of the gate driver 12 and a data control signal for controlling the operation timing of the source driver 11 by using vertical/horizontal signals V, H and a clock CLK. Further, the timing controller 31 supplies the digital video data RGB input from the system 40 to the source driver 11.

The multi-touch processor 32 calculates the angle of the image sensors SS1 to SS3 facing each of the touch points by using the multi-touch recognition algorithm shown in FIGS. 5 to 16, and calculates the x and y coordinate values of the crossing points existing between the image sensors pairs SS1 and SS2 and SS1 and SS3 and the touch points. And, the multi-touch processor 32 selects x and y coordinate values out of the dead zone from among the x and y coordinate values of the same touch points acquired by the respective image sensors pairs, and eliminate a virtual image in the touch points. The multi-touch processor 32 supplies coordinate data Txy of the touch points finally acquired through a procedure of deleting touch coordinate values in the dead zone and coordinate values of the virtual image. The multi-touch processor 32 shares the timing signal such as the vertical/horizontal synchronization signals V, H and the clock CLK with the timing controller 31, thereby operating in synchronization with the timing controller 31. Accordingly, because the timing controller 31 is synchronized with the multi-touch processor 32, the display of the composite image of the background image and the touch image displayed in the display panel 10 and the coordinate calculation processing of the touch points can be synchronized.

The system 40 includes a memory in which an application program is embedded; a central processing unit (CPU) for executing the application program; and a graphic-processing circuit for compounding the background image and the touch image and processing the signal interpolation of the composite data, the resolution conversion thereof and the like. The system 40 receives the coordinate data Txy from the multi-touch processor 32 and executes the application program linked to the coordinate value of the coordinate data. For example, if there is an icon of a specific program in coordinates of a touch point, the system 40 loads the program into the memory and executes the program. Further, the system 40 generates digital video data RGB desired to be displayed on the display panel 10 by compounding the background image and the touch image. The system 40 may be implemented on a personal computer (PC), and receives data Txy from the multi-touch processor 32 through a serial or universal serial bus USB interface.

Figure 5:
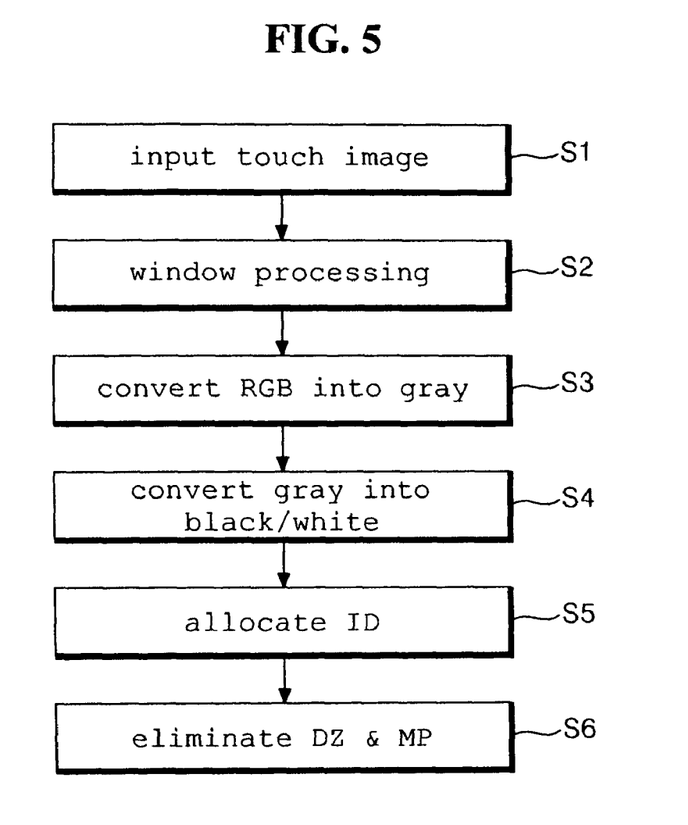
FIG. 5 is a flowchart showing step by step a control procedure of a multi-touch sensing method according to an exemplary embodiment of the present invention.

FIG. 5 is a flowchart showing step by step a control procedure of a multi-touch recognition algorithm which is executed in the multi-touch processor 32.

Figure 6:
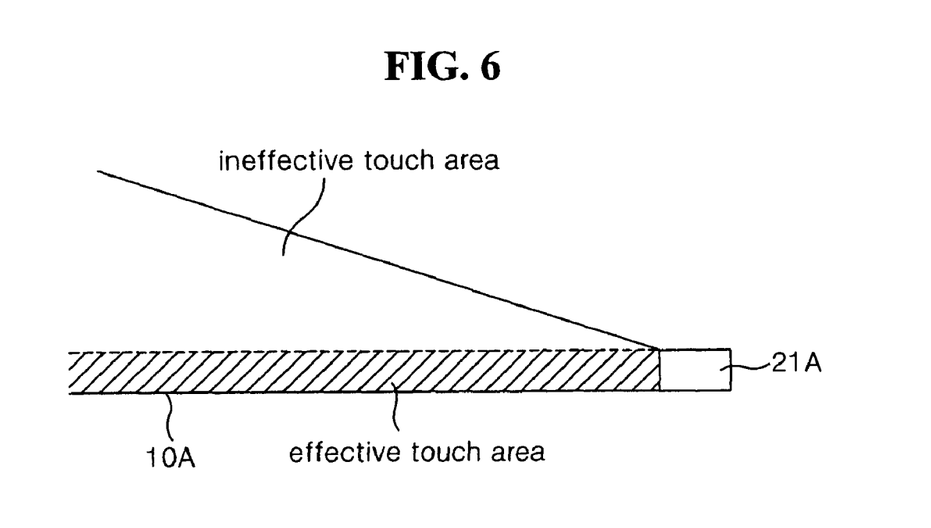
FIG. 6 is a view for explaining windows processing.

Referring to FIG. 5, the multi-touch processor 32 receives the image taken by the image sensors SS1 to SS3 and extracts the image of an effective touch area through a window processing (S1 and S2). Referring to FIG. 6, the touch image taken from the image sensors SS1 to SS3 includes the image of the touch surface 10A and the image of a space above the touch surface 10A. The multi-touch processor 32 selects the image (hatched part) of the effective touch area in the vicinity of the touch surface 10A from the image taken from each image sensor SS1 to SS3, through the window processing. The window processing may use an image extraction technique such that only a target image is extracted for the input image signal through a sub-matrix operation.

The multi-touch processor 32 converts R, G, B data included in the image of the effective touch area extracted by the window processing into gray information using an equation 1 (S3).

Gray information(Gray scale intensity)=$pR+qG+sB$ [Equation 1]

Herein, 'p', 'q' and 's' are constants which are different from each other.

Figure 7:
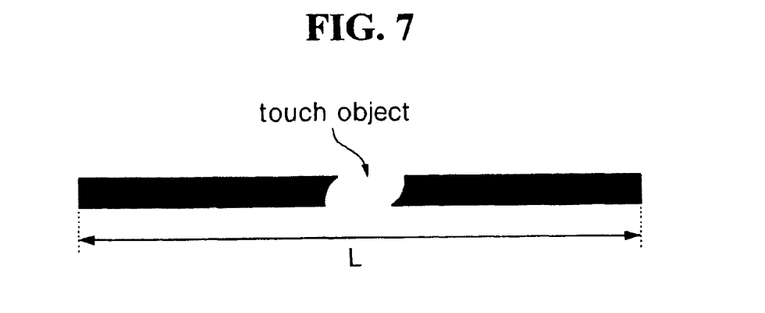
FIG. 7 is a view showing an example of an image acquired from the image sensors.
Figure 8:
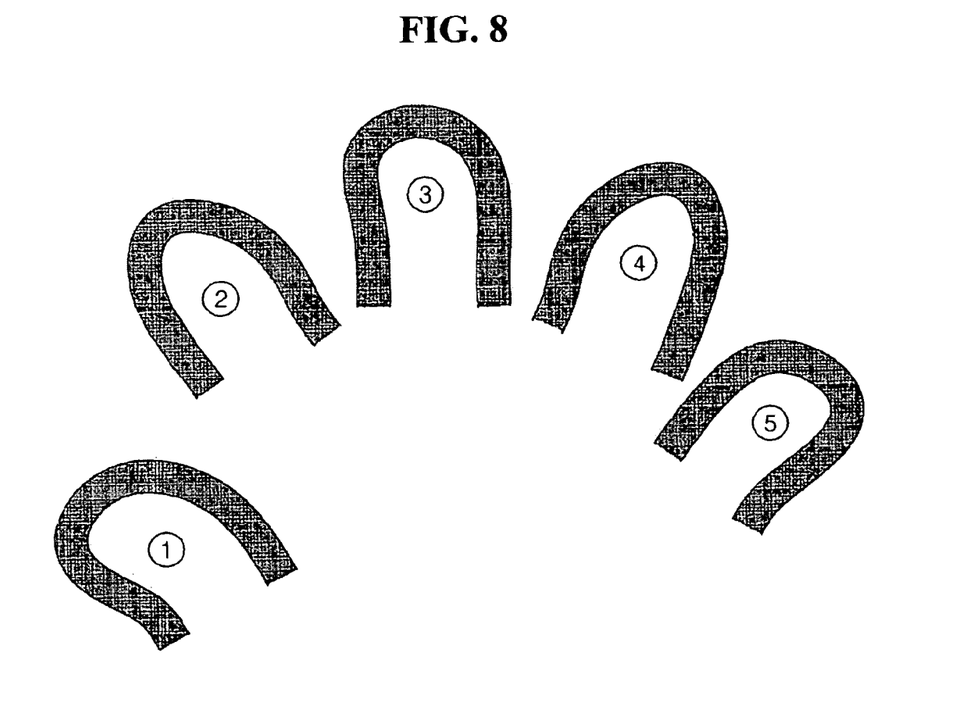
FIG. 8 is a view showing an example of allocating identifier codes to touch points.

The multi-touch processor 32 compares the gray information (gray scale intensity) extracted in S4 with the pre-set threshold value. And, the multi-touch processor 32 converts the gray information which is equal to or more than the threshold value into white data, and converts the data less than the threshold value into black data (S4). FIG. 7 shows one example of a touch image acquired through steps S1 to S4. In this image, the white image represents an image of a touch object, and the black image represents a background image excluding the image of the touch object. Subsequently, as shown in FIG. 8, the multi-touch processor 32 identifies detected touch points using a unique identifier code (ID) for each of the touch points (S5).

Subsequently, the multi-touch processor 32 calculates the angle between the image sensors and the touch points from the images acquired from the image sensors pairs, calculates the x and y coordinate values of each of the touch points on the basis of the angle, and then eliminates the touch coordinate values of a dead zone DZ and the coordinate values of a virtual image MP (S6).

Figure 9:
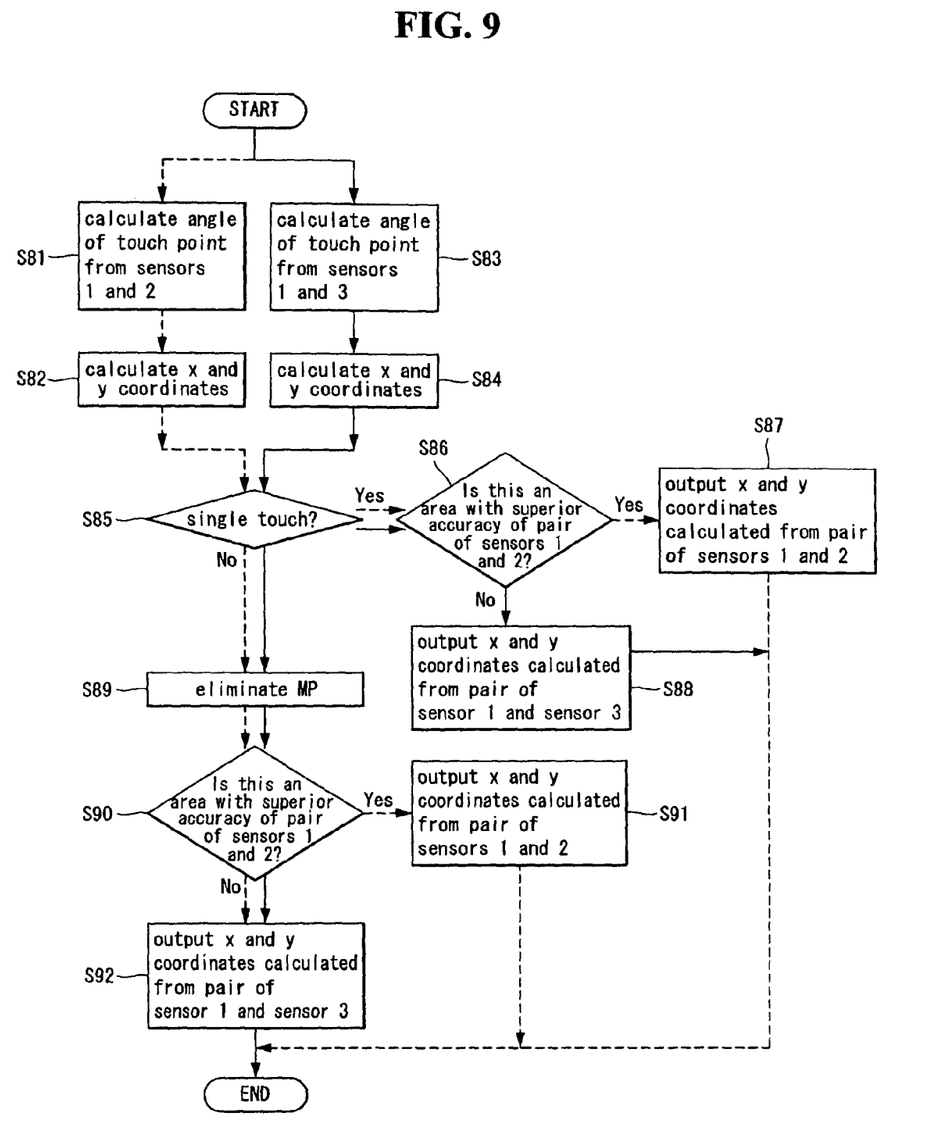
FIG. 9 is a flowchart showing in detail a control procedure of step S6 in FIG. 5.

Referring to FIG. 9, the multi-touch processor 32 calculates the angle of the image sensors facing each of the touch points from the images acquired from the first pair of image sensors SS1 and SS2, and calculates the angle of the image sensors facing each of the touch points from the images acquired from the second pair of image sensors SS1 and SS3 (S81 and S83). The angle θ between the touch points and the image sensors can be calculated by multiplying a value, which is obtained by dividing the location Ptouch of the touch object of FIG. 7 by the horizontal length L of the image, by the lens angle of view (or viewing angle) θview of the image sensors in accordance with equation 2 below.

$$\theta = \frac{P_{touch}}{L} \times \theta_{view}$$ [Equation 2]

Figure 10:
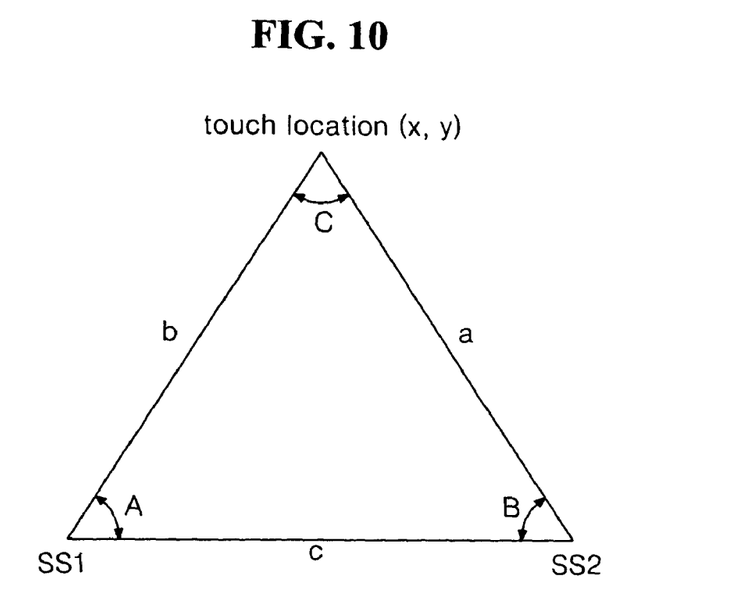
FIG. 10 is a view for explaining triangulation.

In steps S82 and S84, the multi-touch processor 32 calculates the x and y coordinate values of each of the touch points by triangulation using trigonometric functions as in equation 3 below (S82 and S84). Mathematical formula 3 is a calculation formula calculating one touch point to the two-dimensional x and y coordinate values, and includes angles A and B between the touch points and the image sensors which are measured in steps S81 to S84 and distances a, b, and c between the image sensors and the touch points. Herein, the angle C between the touch location and the cameras is calculated as "C=180−angle A−angle B".

$$a = c * \frac{\sin A}{\sin C}$$ [Equation 3]
$$b = c * \frac{\sin B}{\sin C}$$
$$x = b * \cos A$$
$$y = b * \sin A$$

In steps S82 and S84, each of the measured touch points may include the coordinate values of the dead zone DZ and the coordinate values of the virtual image MP. The multi-touch processor 32 eliminates the coordinate values of the dead zone DZ and virtual image MP by processing the algorithm of steps S85 to S92. Before describing this method, the virtual image MP and the dead zone DZ will be described with reference to FIGS. 11 to 14b.

Figure 11:
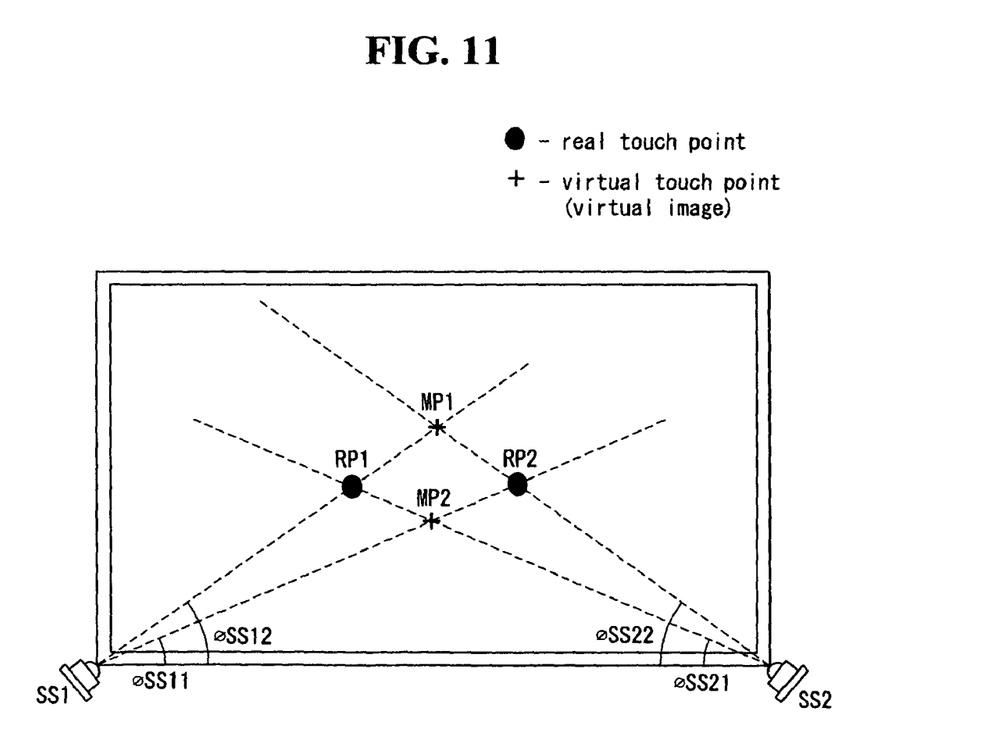
Figure 12A:
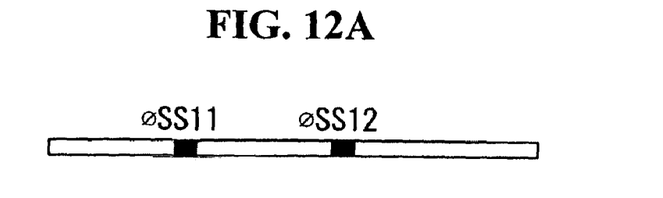
Figure 12B:
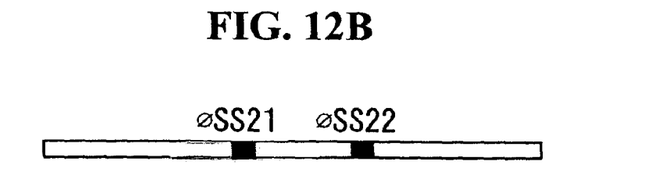
Figure 13:
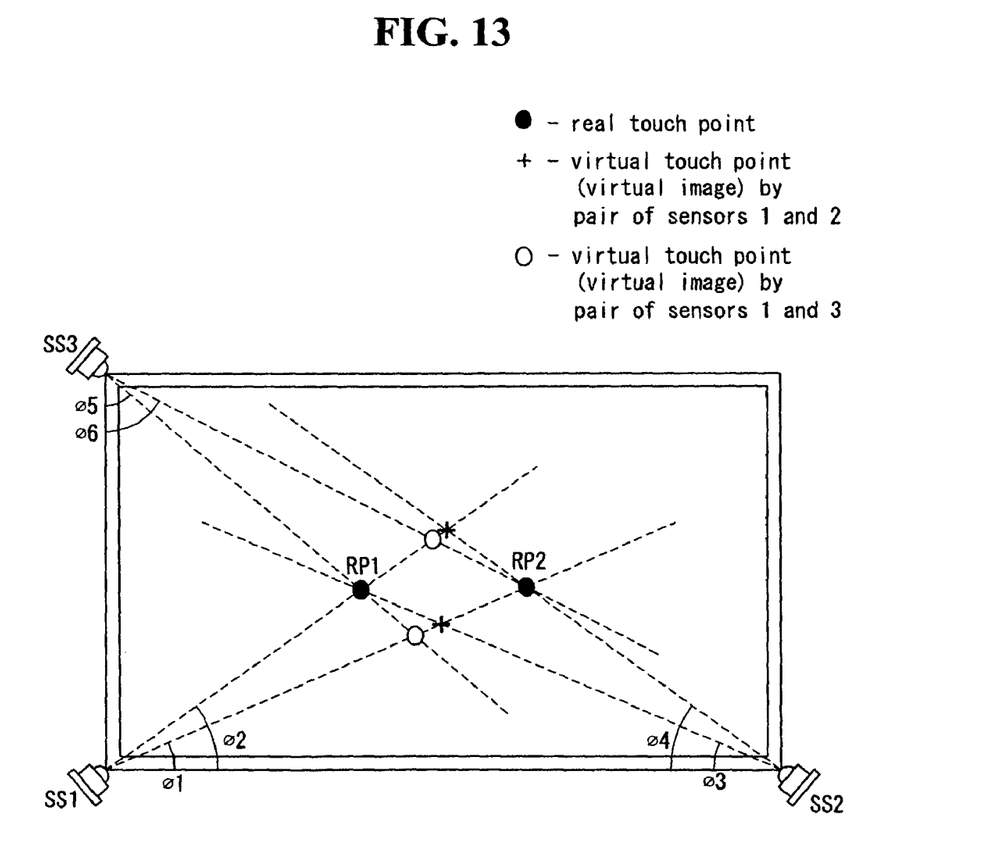

As shown in FIG. 11, if two real touch points RP1 and RP2 exist on the touch surface 10A, virtual touch points MP1 and MP2, in addition to the crossing points of the real touch points, exist on the extended lines between the touch points RP1 and RP2 and the image sensors SS1 and SS2. FIG. 12A illustrates the image acquired from the first image sensor SS1, and FIG. 12B illustrates the image acquired from the second image sensor SS2. In steps S81 to S84, the x and y coordinate values of each of the four touch points are calculated without discriminating between the real touch points RP1 and RP2 and the virtual touch points MP1 and MP2. As in the present invention, when three image sensors SS1 to SS3 are disposed on the three corners of the touch surface 10A and two real touch points are input onto the touch surface 10A in order to form two image sensor pairs, a virtual touch point pair that the first pair of image sensors SS1 and SS2 faces and a virtual touch point pair that the second pair of image sensors SS1 and SS3 faces, as well as the real touch points, appear as shown in FIG. 13. When one touch point, that is, a single touch, is input onto the touch surface 10A, only one crossing point exists on the extended lines between the image sensors and the single touch point, and hence no virtual image appears. Accordingly, if there is only one coordinate of the touch point calculated in steps S81 to S84, the multi-touch processor 32 eliminates only the coordinate values of the dead zone without needing to eliminate a virtual touch point in steps S86 to S88.

Figure 14A:
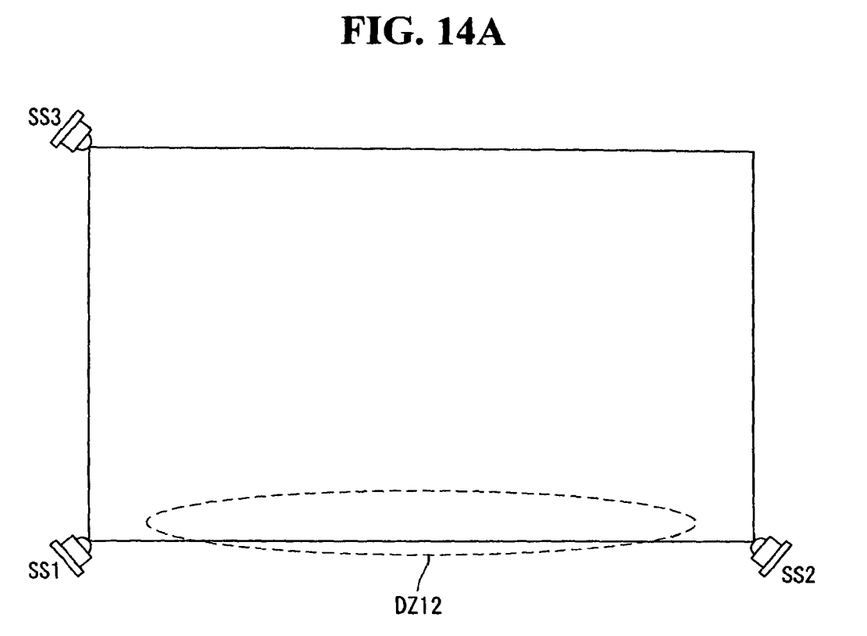
FIGS. 14A and 14B are views showing dead zones.
Figure 14B:
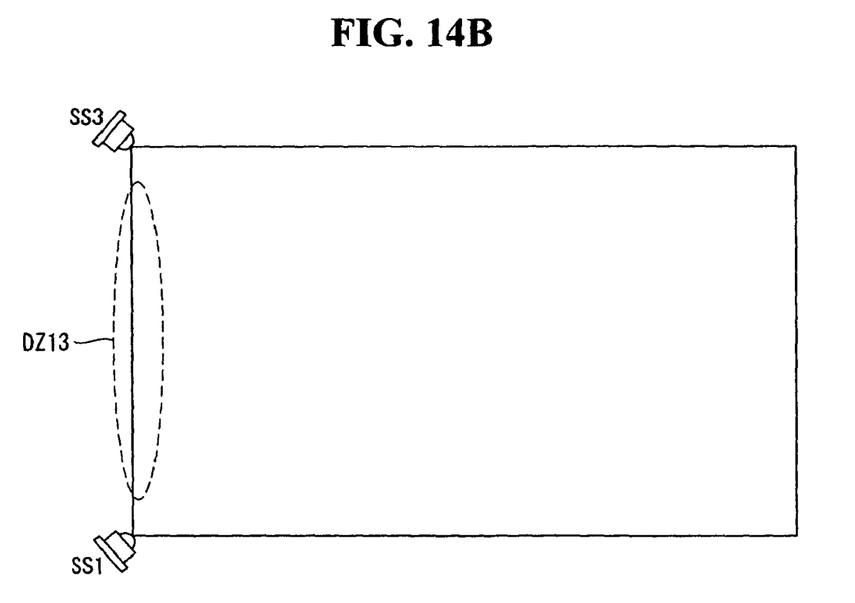

The dead zone DZ exists at a portion with a small angle between the image sensor pairs and has significantly low touch accuracy. FIGS. 14A and 14B are simulation screens showing touch-recognizable points, and it can be seen that the density of touch-recognizable points is significantly low in dead zones DZ12 and DZ13. FIG. 14A shows the first dead zone DZ12 between the first pair of image sensors SS1 and SS2 existing on the bottom of the touch surface 10A, and FIG. 14B shows the second dead zone DZ13 between the second pair of image sensors SS1 and SS3 existing at one edge of the touch surface 10A.

The first dead zone DZ12 between the first pair of image sensors SS1 and SS2 is an area with a high touch point recognition rate as shown in FIG. 14B when viewed from the second pair of image sensors SS1 and SS3, and the second dead zone DZ13 between the second pair of image sensors SS1 and SS3 is an area with a high touch point recognition rate as shown in FIG. 14A when viewed from the first pair of image sensors SS1 and SS2. The multi-touch processor 32 stores the coordinate values of the dead zones DZ12 and DZ13 beforehand.

When a single touch is input, the multi-touch processor compares the coordinate values of the single touch point and the dead zones DZ12 and DZ13, and if it is judged that the single touch point is positioned in a dead zone area, judges which dead zone the single touch point belongs (S85 and S86). As a result, if the single touch point belongs to the second dead zone DZ13, the multi-touch processor 32 outputs the coordinate value calculated from the first pair of image sensors SS1 and SS2 (S87). If the single touch point belongs to the first dead zone DZ12, the multi-touch processor 32 outputs the coordinate value calculated from the second pair of image sensors SS1 and SS3 (S88). Accordingly, the multi-touch processor 32 can select the coordinate value of a touch point which is not affected by the dead zones DZ12 and DZ13 on the touch surface 10A by selecting a coordinate value acquired from the image sensor pair with high touch accuracy from among the two image sensor pairs SS1 and SS2 and SS1 and SS3.

The multi-touch processor 32 eliminates the coordinate values of the dead zones after deleting virtual images from among multi-touch points when a multi-touch is input (S85 and S85-S92). A virtual image elimination algorithm S89 will be described with reference to FIGS. 15 and 16.

Figure 15:
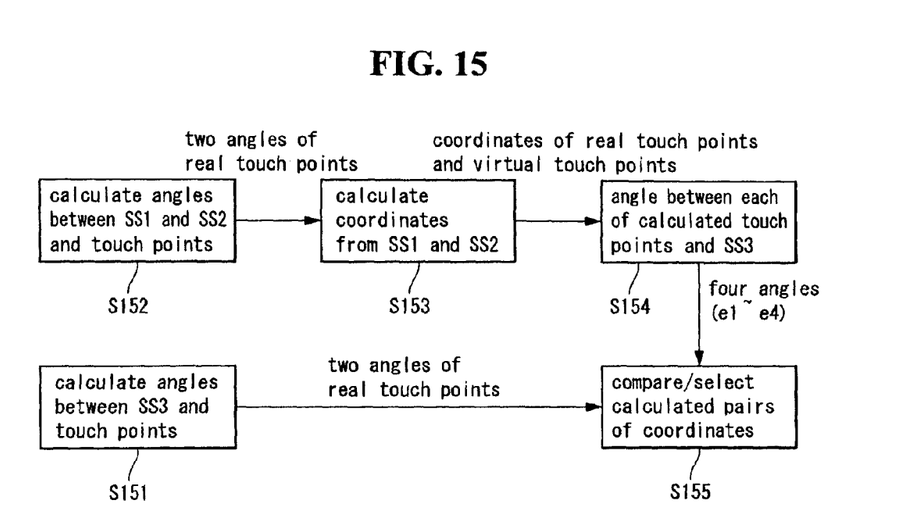
FIG. 15 is a flowchart showing in detail a control procedure of step S89 in FIG. 9.
Figure 16:
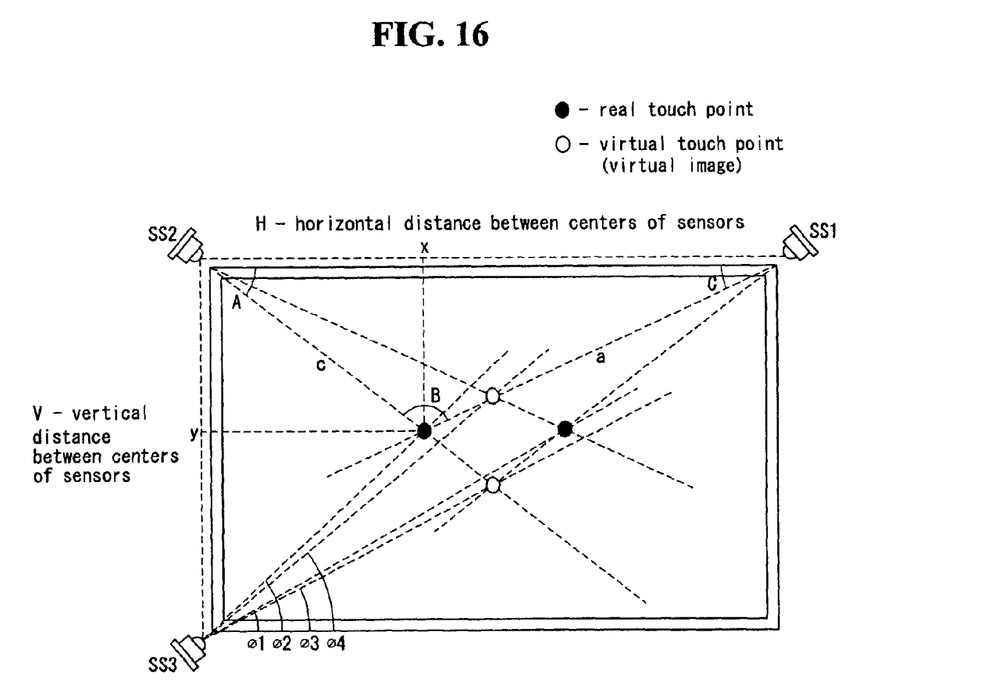
FIG. 16 is a view schematically showing the principle of image elimination.

Referring to FIGS. 15 and 16, the multi-touch processor 32 calculates two angles between the third image sensor SS3 and the two real touch points RP1 and RP2, and stores the angles in the memory (S151). The multi-touch processor 32 calculates angles between the first and second image sensors SS1 and SS2 and the real touch points RP1 and RP2, and calculates coordinate values of the real touch points RP1 and RP2 and virtual touch points MP1 and MP2 on the basis of the angle values (S152 and S153). And, the multi-touch processor 32 calculates four angle values by calculating the angles between each of the coordinate values calculated in step S152 and the third image sensor SS3 (S154). Finally, the multi-touch processor 32 compares the two angle values between the third image sensor SS3 and the real touch points RP1 and RP2 calculated and stored beforehand in step S151 and the four angle values calculated in step S154, and selects the coordinate values with a smaller difference therebetween (S155). Meanwhile, angle and coordinate calculation operations are processed previously in steps S81 to S84. Therefore, the multi-touch processor 32 does not have to store the angles and coordinate values calculated in steps S81 to S84 in the memory and perform the operations of steps S151 to S154.

The touch points calculated in step S154 include the angle values of the real touch points RP1 and RP2 and virtual touch points MP1 and MP2. As shown in FIG. 16, among these angle values, the angle values of the real touch points RP1 and RP2 have a smaller difference with the angle values of the two real touch points calculated beforehand in step S155. Subsequently, the multi-touch processor 32 can eliminate the virtual touch points by using the virtual image elimination algorithm including steps S151 to S155.

When a multi-touch is input, the multi-touch processor 32 eliminates a virtual image by using the virtual image elimination algorithm of S89, then compares the coordinate values of the real touch points RP1 and RP2 and the coordinate values of the dead zones DZ12 and DZ13, and judge which dead zone the touch points belong if it is judged that the real touch points RP1 and RP2 are positioned in the dead zones DZ12 and DZ13 (S90). As a result, if the touch points RP1 and RP2 belong to the second dead zone DZ13, the multi-touch processor 32 outputs the coordinate values calculated from the first pair of image sensors SS1 and SS2 (S91). If the touch points RP1 and RP2 belong to the first dead zone DZ12, the multi-touch processor 32 outputs the coordinate values calculated from the second pair of image sensors SS1 and SS3 (S92). Accordingly, when a multi-touch is input, the multi-touch processor 32 can select coordinate values which are not affected by the dead zones DZ12 and DZ13 on the touch surface 10A by eliminating a virtual image and selecting coordinate values with high touch accuracy from among the coordinate values of the remaining real touch points.

Although the foregoing exemplary embodiment has been described with respect to three image sensors for forming two image sensor pairs in order to eliminate a virtual image and coordinate values of a dead zone, three or more image sensors may be provided. For example, if four image sensors are provided and the sensors are respectively disposed at the four corners of the touch surface 10A, the number of image sensors for detecting a virtual image increases as much. Thus, it is possible to eliminate a virtual image more accurately and reduce the effect of a dead zone further by comparing the angle values obtained from the image sensors by using the aforementioned virtual image elimination algorithm.

As discussed above, the multi-touch sensing method and apparatus according to the exemplary embodiment of the present invention can increase the touch recognition rate and accuracy of a dead zone by identifying the location of a touch surface to which a touch point belongs and, selecting the coordinate values acquired from the other image sensor pair if the location of the touch point belongs to the dead zone of any one of the image sensor pairs, and can eliminate virtual touch points by comparing the angles of the real/virtual touch points acquired from one image sensor pairs and the angles of the real touch points acquired beforehand by the other image sensor and selecting the touch points with a smaller difference.

From the foregoing description, those skilled in the art will readily appreciate that various changes and modifications can be made without departing from the technical idea of the present invention. Therefore, the technical scope of the present invention is not limited to the contents described in the detailed description of the specification but defined by the appended claims.

What is claimed is:

1. A multi-touch sensing method, comprising:
   (A) storing, in a memory, coordinate values of a first dead zone existing between a first pair of image sensors and coordinate values of a second dead zone existing between a second pair of image sensors;
   (B) calculating coordinate values of a touch point from images obtained by the first pair of image sensors;
   (C) calculating the coordinate values of the touch point from images obtained by the second pair of image sensors;
   (D) comparing the coordinate values of the touch point and the coordinate values of the dead zones to identify a location of the dead zone to which the touch point belongs;
   (E) selecting the coordinate values calculated in the C step if the coordinate values of the touch point belong to the first dead zone; and
   (F) selecting the coordinate values calculated in step B if the coordinate values of the touch point belong to the second dead zone.

2. The multi-touch sensing method of claim 1, wherein the first pair of image sensors includes first and second image sensors, and the second pair of image sensors includes the first image sensor and a third image sensor.

3. The multi-touch sensing method of claim 2, further comprising:
   deleting coordinate values of a virtual image among the coordinate values, if it is judged that there exists a plurality of coordinate values which are calculated from the images of the first and second pairs of image sensors as a result of calculation of the B and C steps, wherein the D to F steps are processed after the virtual image is eliminated.

4. The multi-touch sensing method of claim 3, wherein the deleting of coordinate values of a virtual image comprises:
   calculating angle values of the touch points from an image obtained from the third image sensor and storing the angle value in the memory;
   calculating angle values between the coordinate values calculated in the B step and the third image sensor; and
   comparing the angle values of the touch points stored in the memory with the angle values between the coordinate values calculated in the B step and the third image sensor and selecting the touch points having a smaller difference therebetween.

5. The multi-touch sensing method of claim 1, wherein, as a result of calculations of the B and C steps, steps D to F are processed if there exists only one coordinate value calculated from the images of the first and second pairs of image sensors.

6. A multi-touch sensing apparatus, comprising:
   first and second pairs of image sensors installed in the vicinity of the corners of a touch surface;
   a memory for storing coordinate values of a first dead zone existing between the first pair of image sensors and coordinate values of a second dead zone existing between the second pair of image sensors; and
   a multi-touch processor which calculates coordinate values of a touch point from images obtained by the first pair of image sensors and coordinate values of the touch point from images obtained by the second pair of image sensors, compares the coordinate values of the touch point and the coordinate values of the dead zones to identify a location of the dead zone to which the touch point belongs as a result of comparison, selects the coordinate values calculated from the images obtained by the second pair of image sensors if the coordinate values of the touch point belong to the first dead zone, and selects the coordinate values calculated from the images obtained by the first pair of image sensors if the coordinate values of the touch point belong to the second dead zone.

7. The multi-touch sensing apparatus of claim 6, wherein the first pair of image sensors includes first and second image sensors, and the second pair of image sensors includes the first image sensor and a third image sensor.

8. The multi-touch sensing apparatus of claim 7, wherein, as a result of calculating the coordinate values of the touch point from images obtained by the first pair of image sensors and the coordinate values of the touch point from images obtained by the second pair of image sensors, the multi-touch processor eliminates coordinate values of a virtual image among the coordinate values if there exists a plurality of coordinate values calculated from the images of the first and second pairs of image sensors.

9. The multi-touch sensing apparatus of claim 8, wherein the multi-touch processor:
   calculates angle values of the touch points from an image obtained from the third image sensor and storing the angle values in the memory;
   calculates angle values between the coordinate values of the touch point from images obtained by the first pair of image sensors and the third image sensor; and
   compares the angle values of the touch points stored in the memory with the angle values between the coordinate values of the touch point from images obtained by the first pair of image sensors and the third image sensor, and selects the touch points having a smaller difference therebetween.

10. The multi-touch sensing apparatus of claim 6, wherein, as a result of calculating the coordinate values of the touch point from images obtained by the first pair of image sensors and the coordinate values of the touch point from images obtained by the second pair of image sensors, if there exists only one coordinate value, the multi-touch processor compares the coordinate values of the touch point and the coordinate values of the dead zones to identify the location of the dead zone to which the touch point belongs as a result of comparison, selects the coordinate values calculated from the images obtained by the second pair of image sensors if the coordinate values of the touch point belong to the first dead zone, and selects the coordinate values calculated from the images obtained by the first pair of image sensors if the coordinate values of the touch point belong to the second dead zone.

* * * * *